US011720107B2

(12) United States Patent
Lai

(10) Patent No.: US 11,720,107 B2
(45) Date of Patent: Aug. 8, 2023

(54) MEMORY SUB-SYSTEM AUTONOMOUS VEHICLE LOCALIZATION

(71) Applicant: Micron Technology, Inc., Boise, ID (US)

(72) Inventor: Meng Yew Lai, Singapore (SG)

(73) Assignee: Micron Technology, Inc., Boise, ID (US)

( * ) Notice: Subject to any disclaimer, the term of this patent is extended or adjusted under 35 U.S.C. 154(b) by 301 days.

(21) Appl. No.: 17/031,605

(22) Filed: Sep. 24, 2020

(65) Prior Publication Data
US 2022/0091611 A1 Mar. 24, 2022

(51) Int. Cl.
*G05D 1/02* (2020.01)
*G06K 7/10* (2006.01)
(Continued)

(52) U.S. Cl.
CPC ....... *G05D 1/0212* (2013.01); *B60W 60/0025* (2020.02); *G01C 21/206* (2013.01);
(Continued)

(58) Field of Classification Search
CPC ............... G05D 1/0212; G05D 1/0088; G05D 2201/0212; G05D 1/0244; B60W 60/0025;
(Continued)

(56) References Cited

U.S. PATENT DOCUMENTS 4,811,228 A * 3/1989 Hyyppa ............... G05D 1/0236
  701/25
5,367,458 A * 11/1994 Roberts ............... G05D 1/0244
  701/25
(Continued)

FOREIGN PATENT DOCUMENTS

DE 102007021762 B4 * 2/2019 ........... G01S 17/936
KR 20100015741 A * 2/2010 ............... G05D 1/02

OTHER PUBLICATIONS

Happich, "RFID Sensor Tags to Monitor Road Conditions", Feb. 16, 2015, (1 pg.), eeNews Europe, dated Feb. 16, 2015, retrieved from http://www.eenewseurope.com/news/rfid-sensor-tags-monitor-road-conditions.
(Continued)

*Primary Examiner* — Elaine Gort
*Assistant Examiner* — Ellis B. Ramirez
(74) *Attorney, Agent, or Firm* — Brooks, Cameron & Huebsch, PLLC

(57) ABSTRACT

A method can include sending, via a processing device, a signal to at least two of a plurality of location indicators from an autonomous vehicle in motion and transporting equipment or passengers. The method can further include receiving signals from the at least two location indicators. The method can further include determining a location of the autonomous vehicle within an indoor facility based on the received signals. The method can further include comparing the determined location to a corresponding pre-determined location. The method can further include, in response to the determined location being different than the pre-determined location, adjusting a direction of the autonomous vehicle along a predetermined path within the indoor facility.

22 Claims, 8 Drawing Sheets

(51) Int. Cl.
 *G05D 1/00* (2006.01)
 *B60W 60/00* (2020.01)
 *G01C 21/20* (2006.01)
(52) U.S. Cl.
 CPC ....... *G05D 1/0088* (2013.01); *G06K 7/10297* (2013.01); *B60W 2420/62* (2013.01)
(58) Field of Classification Search
 CPC ............. B60W 2420/62; G01C 21/206; G01C 21/3407; G06K 7/10297; G01S 17/06; G01S 2013/9329; G06F 11/3037; G06F 11/328
 USPC .......... 701/26, 41, 48, 60, 65; 340/465, 466, 340/467; 342/69, 71
 See application file for complete search history.

(56) References Cited

U.S. PATENT DOCUMENTS

| | | | |
|---|---|---|---|
| 6,151,539 A | 11/2000 | Bergholz et al. | |
| 6,308,118 B1* | 10/2001 | Holmquist | G01S 17/74 318/587 |
| 7,557,731 B2 | 7/2009 | Ramasubbu | |
| 9,080,866 B1* | 7/2015 | Dowdall | G01C 3/08 |
| 2010/0145550 A1* | 6/2010 | Ross-Martin | G05D 1/0234 701/19 |
| 2012/0098657 A1 | 4/2012 | Bogatine | |
| 2013/0173112 A1 | 7/2013 | Takahashi et al. | |
| 2013/0293394 A1 | 11/2013 | Rubin et al. | |
| 2015/0052352 A1 | 2/2015 | Dolev et al. | |
| 2015/0303581 A1* | 10/2015 | Bodo | G01S 13/426 342/7 |
| 2016/0132705 A1* | 5/2016 | Kovarik | G06K 7/10376 340/10.3 |
| 2016/0260328 A1 | 9/2016 | Mishra et al. | |
| 2018/0006810 A1 | 1/2018 | Ideguchi et al. | |
| 2018/0033301 A1 | 2/2018 | Riou et al. | |
| 2018/0072212 A1* | 3/2018 | Alfaro | B60K 7/0007 |
| 2018/0275680 A1* | 9/2018 | Gupta | G05D 1/0234 |
| 2019/0120967 A1* | 4/2019 | Smits | G01C 21/3626 |
| 2019/0361448 A1* | 11/2019 | Tietze | G01S 17/06 |
| 2020/0101971 A1* | 4/2020 | Fan | G05D 1/024 |
| 2021/0223783 A1* | 7/2021 | M | G05D 1/0234 |

OTHER PUBLICATIONS

U.S. Appl. No. 15/993,119, entitled, "Transmission of Vehicle Route Information by Passive Devices," filed May 30, 2018, (25 pgs.).

* cited by examiner

US 11,720,107 B2

MEMORY SUB-SYSTEM AUTONOMOUS VEHICLE LOCALIZATION

TECHNICAL FIELD

Embodiments of the disclosure relate generally to memory sub-systems, and more specifically, relate to localization of an autonomous vehicle.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Vehicles are becoming more dependent upon memory sub-systems to provide storage for components that were previously mechanical, independent, or non-existent. A vehicle can include a computing system, which can be a host for a memory sub-system. The computing system can run applications that provide component functionality. The vehicle may be driver operated, driver-less (autonomous), and/or partially autonomous. The memory device can be used heavily by the computing system in a vehicle.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
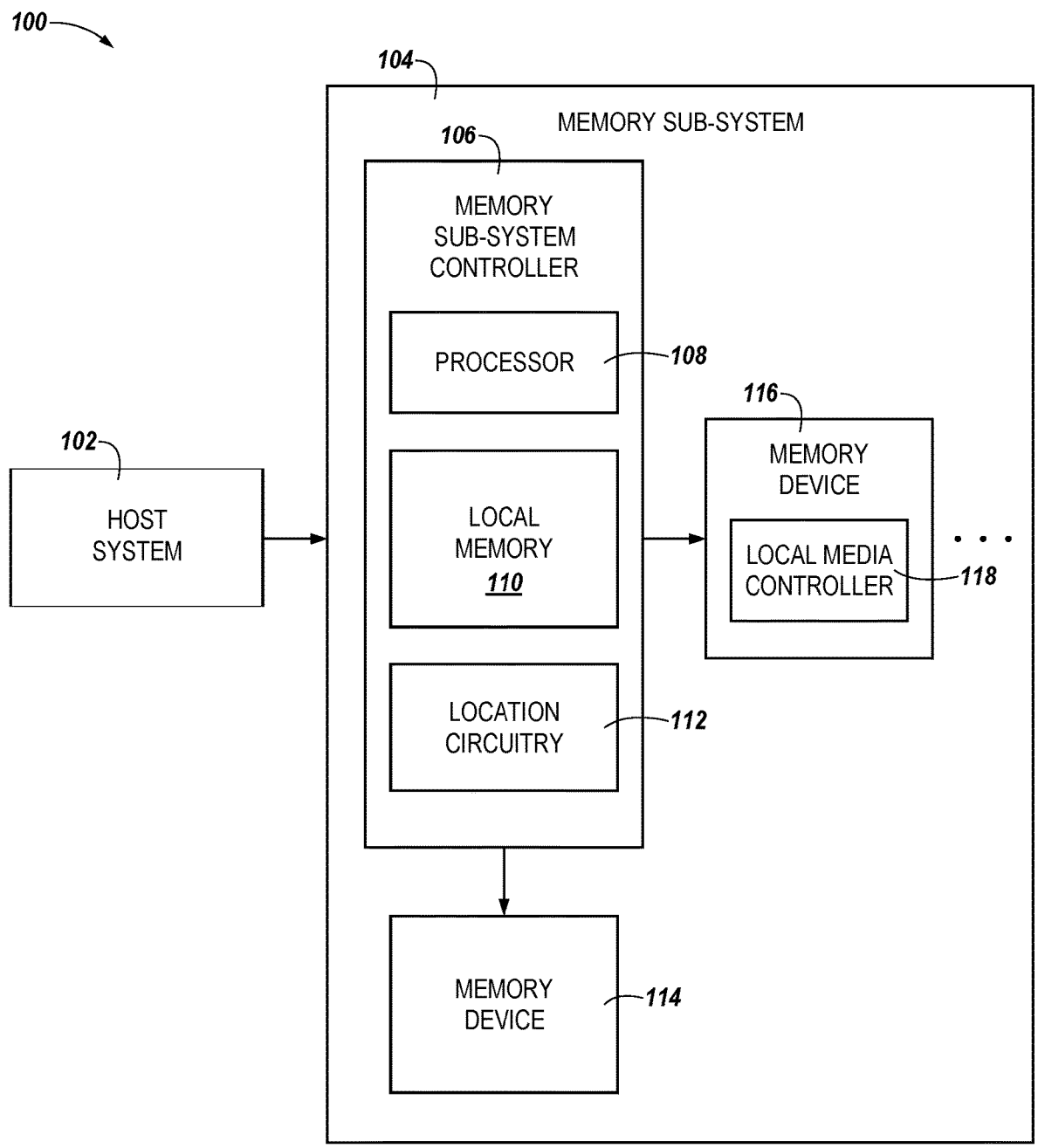
FIG. 1 illustrates an example computing system that includes a memory sub-system in accordance with some embodiments of the present disclosure.

Aspects of the present disclosure are directed to localization of a vehicle, such as an autonomous vehicle. A vehicle can include a memory sub-system, such as a solid state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). The memory sub-system can be used for determining a location and/or a path along a pathway of the vehicle. An example of such a determination can include sending a signal to at least two of a plurality of sensors from a vehicle in motion. The example can include receiving signals from the at least two sensors and determining a location of the vehicle based on the signals from the at least to sensors. The determined location can be compared to a corresponding pre-determined location. In response to the determined location being different than the pre-determined location, a direction of the vehicle can be adjusted.

In some previous approaches, global positioning system (GPS) data or other similar data can be used to determine a location of and/or pathway for a vehicle to take. However, this type of GPS or similar data can be limited due to signal interference, loss of satellite signal, going under an underpass, power generator interference, etc. Further, the method using this type of GPS or other similar data can involve more complicated analysis as compared to embodiments of the present disclosure. As is described below, it can be desirable to locate a vehicle and/or determine a vehicle pathway using an approach that can operate and function even in the presence of the interference described above (e.g., without GPS).

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 406 in FIG. 4. Analogous elements within a Figure may be referenced with a hyphen and extra numeral or letter. Such analogous elements may be generally referenced without the hyphen and extra numeral or letter. For example, elements 444-1, 444-2, . . . , 444-N in FIG. 4 may be referenced collectively as elements 444. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an example computing system 100 that includes a memory sub-system 104 in accordance with some embodiments of the present disclosure. The memory sub-system 104 can include media, such as one or more volatile memory devices 114, one or more non-volatile memory devices 116, or a combination thereof. The volatile memory devices 114 can be, but are not limited to, random access memory (RAM), such as dynamic random access memory (DRAM), synchronous dynamic random access memory (SDRAM), and resistive DRAM (RDRAM).

A memory sub-system 104 can be a storage device, a memory module, or a hybrid of a storage device and memory module. Examples of a storage device include an SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 includes a host system 102 that is coupled to one or more memory sub-systems 104. The host system 102 can be a computing system included in a vehicle. The computing system can run applications that provide component functionality for the vehicle. In some embodiments, the host system 102 is coupled to different types of memory sub-systems 104. FIG. 1 illustrates an example of a host system 102 coupled to one memory sub-system 104. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 includes or is coupled to processing resources, memory resources, and network resources. As used herein, "resources" are physical or virtual components that have a finite availability within a computing system 100. For example, the processing resources include a processing device, the memory resources include memory sub-system 104 for secondary storage and main memory devices (not specifically illustrated) for primary storage, and the network resources include as a network interface (not specifically illustrated). The processing device can be one or more processor chipsets, which can execute a software stack. The processing device can include one or more cores, one or more caches, a memory controller (e.g., NVDIMM controller), and a storage protocol controller (e.g., PCIe controller, SATA controller, etc.). The host system 102 uses the memory sub-system 104, for example, to write data to the memory sub-system 104 and read data from the memory sub-system 104.

The host system 102 can be coupled to the memory sub-system 104 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open not-and (NAND) Flash Interface (ONFI), Double Data Rate (DDR), Low Power Double Data Rate (LPDDR), or any other interface. The physical host interface can be used to transmit data between the host system 102 and the memory sub-system 104. The host system 102 can further utilize an NVM Express (NVMe) interface to access the non-volatile memory devices 116 when the memory sub-system 104 is coupled with the host system 102 by the PCIe interface. The physical host interface can provide an interface for passing control, address, data, and other signals between the memory sub-system 104 and the host system 102. FIG. 1 illustrates a memory sub-system 104 as an example. In general, the host system 102 can access multiple memory sub-systems via a same communication connection, multiple separate communication connections, and/or a combination of communication connections.

The host system 102 can send requests to the memory sub-system 104, for example, to store data in the memory sub-system 104 or to read data from the memory sub-system 104. For example, the host system 102 can use the memory sub-system 104 to provide navigation and location data to the host 102 and/or other memory devices. The data to be written or read, as specified by a host request, is referred to as "host data." A host request can include logical address information. The logical address information can be a logical block address (LBA), which may include or be accompanied by a partition number. The logical address information is the location the host system associates with the host data. The logical address information can be part of metadata for the host data. The LBA may also correspond (e.g., dynamically map) to a physical address, such as a physical block address (PBA), that indicates the physical location where the host data is stored in memory.

An example of non-volatile memory devices 116 include NAND type flash memory. NAND type flash memory includes, for example, two-dimensional NAND (2D NAND) and three-dimensional NAND (3D NAND). The non-volatile memory devices 116 can be other types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAlVI), negative-or (NOR) flash memory, electrically erasable programmable read-only memory (EEPROM), and three-dimensional cross-point memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the non-volatile memory devices 116 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the non-volatile memory devices 116 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory devices 116 can be grouped as pages that can refer to a logical unit of the memory device used to store data. With some types of memory (e.g., NAND), pages can be grouped to form blocks.

The memory sub-system controller 106 (or controller 106 for simplicity) can communicate with the non-volatile memory devices 116 to perform operations such as reading data, writing data, erasing data, and other such operations at the non-volatile memory devices 116. The memory sub-system controller 106 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 106 can be a microcontroller, special purpose logic circuitry (e.g., a field programmable gate array (FPGA), an application specific integrated circuit (ASIC), etc.), or other suitable circuitry.

The memory sub-system controller 106 can include a processing device 108 (e.g., a processor) configured to execute instructions stored in local memory 110. In the illustrated example, the local memory 110 of the memory sub-system controller 106 is an embedded memory configured to store instructions for performing various processes, operations, logic flows, and routines that control operation of the memory sub-system 104, including handling communications between the memory sub-system 104 and the host system 102.

In some embodiments, the local memory 110 can include memory registers storing memory pointers, fetched data, etc. The local memory 110 can also include ROM for storing micro-code, for example. While the example memory sub-system 104 in FIG. 1 has been illustrated as including the memory sub-system controller 106, in another embodiment of the present disclosure, a memory sub-system 104 does not include a memory sub-system controller 106, and can instead rely upon external control (e.g., provided by an external host, or by a processor or controller separate from the memory sub-system 104).

In general, the memory sub-system controller 106 can receive information or operations from the host system 102 and can convert the information or operations into instructions or appropriate information to achieve the desired access to the non-volatile memory devices 116 and/or the volatile memory devices 114. The memory sub-system controller 106 can be responsible for other operations such as wear leveling operations, error detection and/or correction operations, encryption operations, caching operations, and address translations between a logical address (e.g., logical block address) and a physical address (e.g., physical block address) associated with the non-volatile memory devices 116. The memory sub-system controller 106 can further include host interface circuitry to communicate with the host system 102 via the physical host interface. The host interface circuitry can convert a query received from the host system 102 into a command to access the non-volatile memory devices 116 and/or the volatile memory devices 114 as well as convert responses associated with the non-volatile memory devices 116 and/or the volatile memory devices 114 into information for the host system 102.

In some embodiments, the memory sub-system 104 can be a managed NAND (MNAND) device in which an external controller (e.g., controller 106) is packaged together with one or more NAND die (e.g., the non-volatile memory device 116). In an MNAND device, the external controller 106 can handle high level memory management functions such as media management and the local media controller 118 can manage some of the lower level memory processes such as when to perform programming operations.

In at least one embodiment, the location circuitry 112 is an ASIC configured to perform the examples described herein. For example, the location circuitry 112 can locate a vehicle at a particular location along a pathway and/or monitor a vehicle along a pathway. In some embodiments, a local media controller 118 of the non-volatile memory device 116 includes at least a portion of the location circuitry 112. For example, the local media controller 118 can include a processor (e.g., processing device) configured to execute instructions stored on the volatile memory devices 114 for performing the operations described herein. In some embodiments, the location circuitry 112 is part of the host system 102, or an operating system. In at least one embodiment, the location circuitry 112 represents data or instructions stored in the memory sub-system 104. The functionality described with respect to the allocation circuitry 112 can be embodied in machine-readable and executable instructions stored in a tangible machine-readable medium.

The controller 106 can be configured to select a predetermined pathway of a vehicle along a pathway. The controller can be configured to determine anticipated locations of a plurality of location indicators based on the selected predetermined pathway prior to the vehicle traversing the predetermined pathway. The controller 106 can be configured to send a signal to at least one a plurality of location indicators and receive a signal back from the at least one of the plurality of location indicators. The controller 106 can be configured to compare the determined anticipated locations of the at least one location indicator to a real-time location of the location indicator based on the received signal.

Figure 2A:
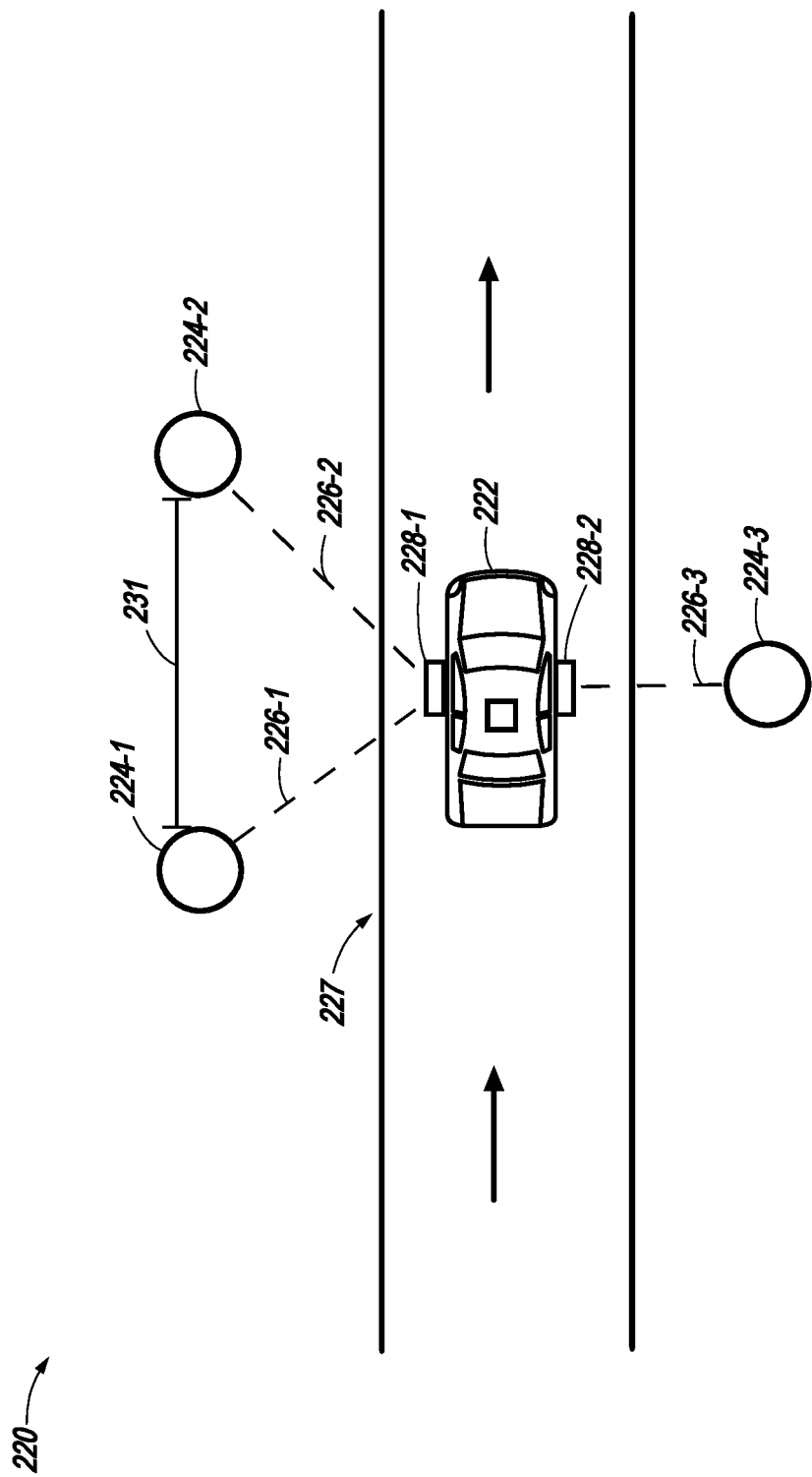
FIG. 2A is a flow diagram of a vehicle, a pathway, and sensors for autonomous vehicle localization in accordance with some embodiments of the present disclosure.

FIG. 2A is a flow diagram 220 of a vehicle (e.g., an autonomous vehicle) 222, a pathway 227, and location indicators 224-1, 224-2, 224-3 for localization in accordance with some embodiments of the present disclosure. The location indicators 224 can be at predetermined or known locations. The predetermined or known location of the location indicators 224 can be used to determine a location of the vehicle 222.

For instance, a vehicle 222 can be in motion along a pathway 227. The vehicle 222 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The vehicle 222 can be traveling within an indoor facility or an enclosed structure. The vehicle 222 can be transporting goods, equipment, cargo, passengers, etc. within the indoor facility or enclosed structure. The pathway 227 can be a pathway for the vehicle 222 to traverse in order to avoid other obstructions, objects, people, etc. while transporting the goods, equipment, cargo, passengers, etc.

In some embodiments, the pathway 227 can bring the vehicle 222 to a location where a global positioning system (GPS) may not function or GPS data may not be receivable or sendable due to signal interference, loss of satellite signal, going under an underpass, power generator interference, signal obstructions, etc. In order to determine a location of the vehicle 222 in the absence of GPS or other similar technology whose signals may be blocked or interfered with, an approach as described below can be used.

A vehicle 222 can use a plurality of location indicators 224-1, 224-2, 224-3 (hereinafter referred to collectively as plurality of location indicators 224) to locate a position along the pathway 227. In one example, the plurality of location indicators 224 can be a plurality of reflective mirrors. The vehicle 222 can send a signal, such as a laser signal, to a location indicator 224-1 and the location indicator 224-1 can send a signal 226-1 back, such as a reflected laser signal. A sensor 228-1 on the vehicle 222 can receive the signal 226-1 from the location indicator 224-1. The received signal 226-1 can indicate a particular distance that the vehicle 222 is from the location indicator 224-1, in addition to a particular location along the pathway 227.

In some embodiments, the vehicle 222 can send a signal to an additional location indicator 224-2. The additional location indicator 224-2 can be a particular distance 231 from the location indicator 224-1. The additional location indicator 224-2 can send a signal 226-2 back to the vehicle 222. The vehicle 222 can use both of the signals 226-1, 226-2 sent from the location indicator 224-1 and the additional location indicator 224-2 and the particular distance 231 in order to determine a particular location that the vehicle 222 is at along the pathway 227. In some embodiments, a further location indicator 224-3 can be used and a signal received 226-3 back from the further location indicator 224-3, to a sensor 228-2 of the vehicle 222, can be used either individually or in combination with the other received signals 226-1, 226-2. In this way, a plurality of location indicators 224 can be used to determine a location by the vehicle 222.

In response to the vehicle 222 being in a location, or a particular distance from a location indicator 224, that is incorrect or that diverts the vehicle 222 from an intended or desired pathway (such as pathway 227), the vehicle 222 can adjust a direction and or location and can repeat a location determination using at least one of the plurality of location indicators 224. In at least one example, the direction of the vehicle 222 can be adjusted based on a prior determination of a location of the vehicle 222 along the pathway 227. For example, a previous iteration of traveling along the pathway 227 can include the vehicle 222 determining the vehicle is at a particular location along the pathway 227. During a subsequent traveling of the pathway 227, the vehicle 222 can use the previous determination of the location and learn where the vehicle 222 is located based on a location of the location indicator 224 during the first traversal of the pathway 227 and use that location data during a second traversal of the pathway 227. Such usage of the location data can include using a machine learning process to determine the location during the second traversal. Each iteration of traveling along the pathway 227 can be used in a subsequent machine learning operation during a subsequent traveling along the pathway 227 to locate the vehicle 222 more quickly and more efficiently using the location indicator 224.

The pathway 227 can refer to a predetermined pathway. For example, the pathway 227 can be an intended pathway for the vehicle 222 to traverse. In this way, the pathway 227 can be the pathway that the vehicle 222 is targeting to traverse and when the vehicle 222 leaves the pathway 227, the vehicle 222 adjusts its direction in order to return to the predetermined pathway. In this example, the pathway is not a fixed pathway, such as a road or track but is rather an intended pathway across or through a room, building, flooring, etc. that does not have designated markers, tracks, or indicators that specify where the vehicle 222 should move along. The location indicators 224, therefore, are what indicate to the vehicle 222 what to follow or whether the vehicle 222 is in a correct location while moving.

In some embodiments, the vehicle 222 is traveling along a pathway 227 in an indoor facility or enclosed structure, such as a warehouse, an office building, a storage facility, etc. The indoor facility or enclosed structure may include storage equipment, boxes, object, and/or people that the vehicle 222 may need to avoid or travel around in order to move from a starting point along the pathway 227 to an ending point along the pathway. In this instance, when something or someone is in the way of the normal pathway that the vehicle 222 would traverse, the vehicle 222 may need to adjust movement along the pathway (e.g., leave the intended or predetermined pathway) and use the location indicators 224 to return to the predetermined pathway.

The vehicle 222 can include a memory sub-system, such as memory sub-system 104, that performs operations used to determine the location and/or distance of the vehicle 222. For example, the location circuitry 112 can perform a number of operations that include analyzing the received signals from the plurality of location indicators 224 and determine the location and/or distance of the vehicle 222 based on data of a reflected laser signal, in this example. While laser signals are used to describe a method for determining the location, embodiments are not so limited. For example, any number of active or passive devices can be used. Passive devices can include a mirror, a magnetic identification (ID) device, a radio frequency identification (RFID) device, light-emitting diode (LED) device, etc. Active devices can include a Bluetooth device, an infra-red (IR) device, a modulated light source device, a sonar device, etc.

Figure 2B:
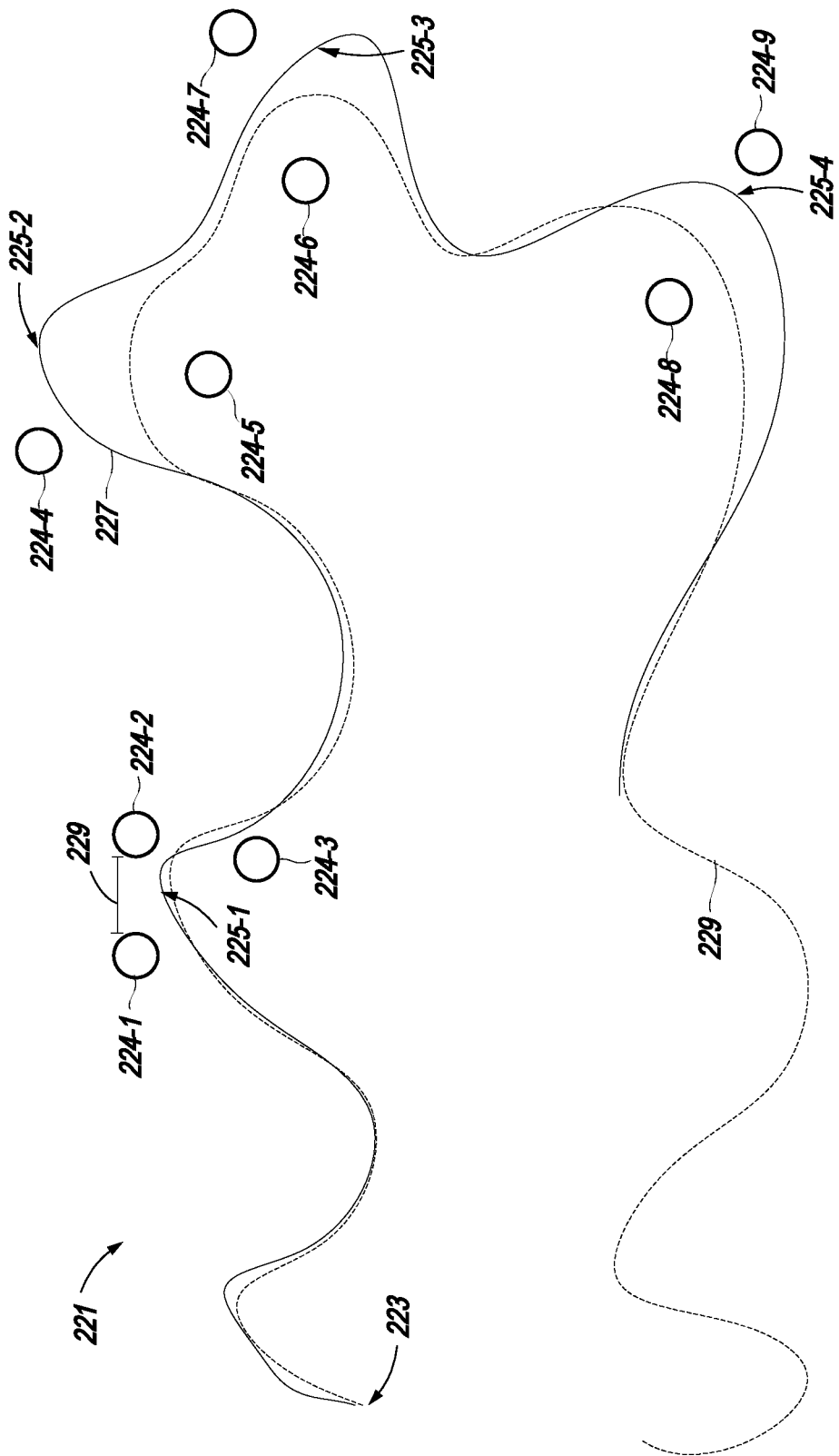
FIG. 2B is a flow diagram of a predetermined pathway, a real-time pathway, and sensors for autonomous vehicle localization in accordance with some embodiments of the present disclosure.

FIG. 2B is a diagram 221 of a predetermined pathway 229, a real-time pathway 227, and location indicators 224 for localization in accordance with some embodiments of the present disclosure. A vehicle, such as vehicle 222 in FIG. 2A, can travel along a pathway, starting at point 223, where the real-time pathway 227 indicates an actual path traveled in real-time by the vehicle and a predetermined pathway 229 (dotted line) can indicate an intended pathway for the vehicle to travel along. A determination can be made, as described in association with FIG. 2A, of a location of the vehicle along the real-time pathway 227. A comparison of the location of the vehicle along the real-time pathway 227 to the predetermined pathway 229 can be made in order to determine whether the vehicle is located where it should be. In response to the location of the vehicle being along the real-time pathway 227 and also along the predetermined pathway 229, no adjustment to the location and/or direction of the vehicle may be made. In response to the location of the vehicle along the real-time pathway 227 being different than the predetermined pathway 229, an adjustment to the direction and/or location of the vehicle can be made to bring the vehicle back onto the predetermined pathway 229.

In one embodiment, the vehicle can be at point 225-1 and can use a number of location indicators 224-1, 224-2, 224-3 to determine a location of the vehicle in relation to the predetermined pathway 229. The number of location indicators 224-1, 224-2, 224-3 can indicate to the vehicle that there is an upcoming turn and be notified of an upcoming turn. In this way, the vehicle can maintain a course along the predetermined pathway 229 by using the location indicators. A distance 229 of two location indicators 224-1, 224-2 can be used in order to determine a location and/or direction of the vehicle along the real-time pathway 227 and whether the vehicle is maintaining a course along the predetermined pathway 229.

In one example, a previously generated map including the predetermined pathway 229 can be used to compare to a map of the current pathway along the real-time pathway 227. In this way, the location indicators 224 not only identify a location and/or direction of the vehicle but can also provide an ability to compare a previously generated map to a real-time map in order to travel through the map. In the event that an object, person, structure, etc. is in the way of the vehicle and the vehicle needs to make a correction to avoid the object, person, structure, etc., the location indicators 224 can be used to reorient the vehicle back onto the predetermined pathway 229 and/or through a previously generated map.

In one embodiment, a vehicle can be approaching location indicators 224-4 and 224-5 and miss a turn along the predetermined pathway 229. The vehicle may be located at point 225-2, which is off or outside the predetermined pathway 229 and use the location indicators 224-4 and 224-5 to determine that the vehicle is not the proper distance from each of the location indicators 224-4 and 224-5 and should be adjusted. Based on signals received from the location indicators 224-4, 224-5, such as a reflected laser signal, the vehicle can be adjusted to turn towards the right from its current position (at point 225-2) and return to the predetermined pathway 229. Likewise, the vehicle can be approaching additional sets of location indicators such as 224-6, 224-7 and use the set of location indicators 224-6, 224-7 to correct from point 225-3 to return to the predetermined pathway 229. Further, the vehicle can use set of location indicators 224-8, 224-9 further along the real-time pathway 227 to correct from the point 225-4 to return to the predetermined pathway 229.

Figure 3:
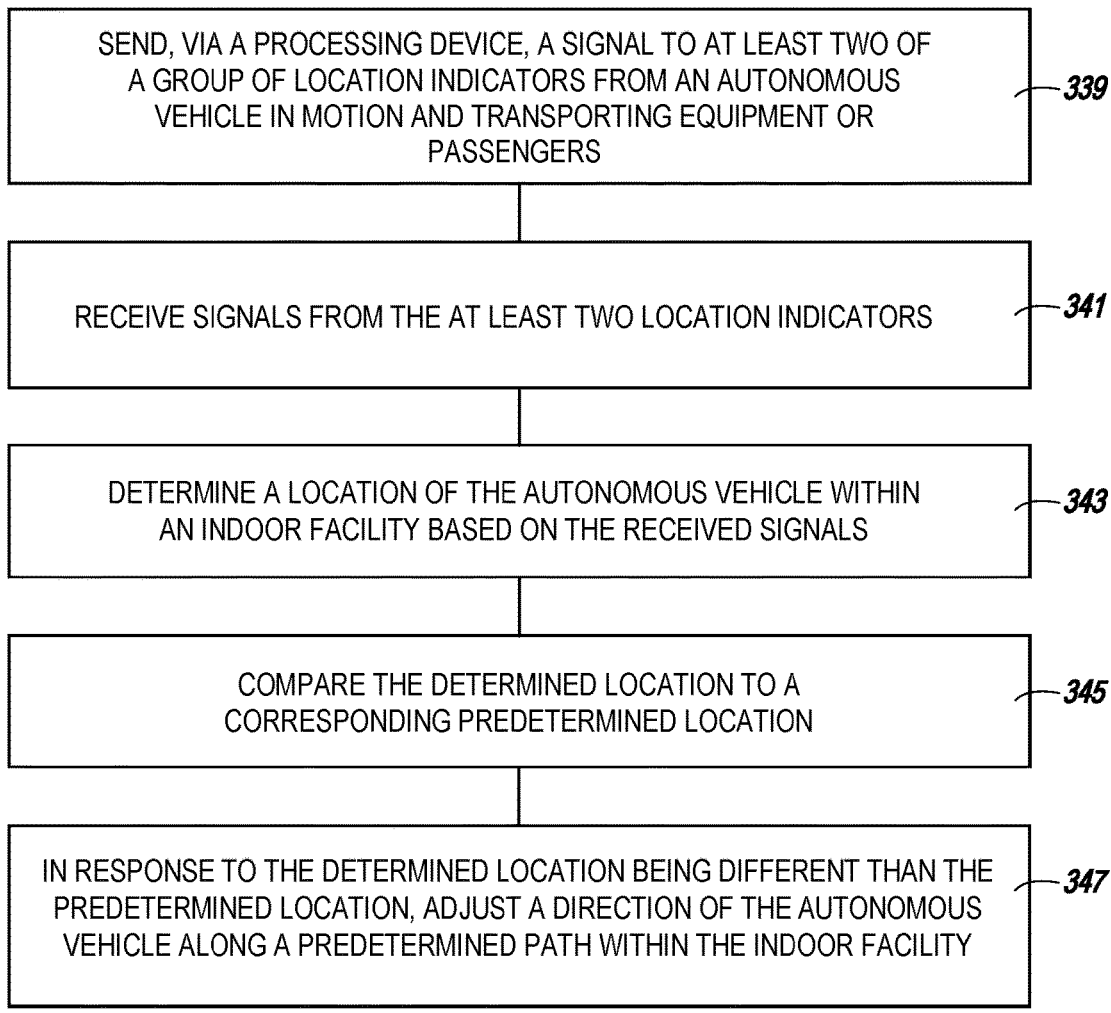
FIG. 3 is a flow diagram of an example method for localization of an autonomous vehicle in accordance with some embodiments of the present disclosure.

FIG. 3 is a flow diagram of an example method 303 for operating a memory device in accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by or using the memory sub-system controller 106, processing device 108, allocation circuitry 112, non-volatile memory device 116 and/or volatile memory device 114, and/or local media controller 118 shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 339 in the example method 303 of FIG. 3, a signal can be sent, via a processing device, to at least two of a plurality of location indicators from an autonomous (e.g., self-driving) vehicle in motion and transporting equipment or passengers. The processing device can be a same processing device 108 in FIG. 1. The signal can be a same signal as signal 226 in FIG. 2A, and the at least two of a group of location indicators can be the same as location indicators 224-1, 224-2 in FIGS. 2A and 2B. The plurality of location indicators can include a plurality of reflective mirrors.

At block 341 in the example method 303 of FIG. 3, signals can be sent from the at least two location indicators. The signals can be laser signals, fixed signals (associated with fixed coordinates) or non-stationary signals (such as signals associated with transponding location data). The signals can be sent to the at least two reflective mirrors via lasers mounted to the vehicle. The signals can be sent to the at least two reflective mirrors in response to the vehicle arriving at a predefined location area. The at least two of the plurality of location indicators can be positioned at a particular location on a roadway that the vehicle is traveling on. The signals can be used to establish a location and/or direction (e.g., bearing) of the vehicle.

At block 343 in the example method 303 of FIG. 3, a location of the vehicle within an indoor facility can be determined based on the received signals. The location of the vehicle can be determined in the absence of global positioning system (GPS) data. Determining the location of the vehicle can include determining a predetermined path of the vehicle and predetermined locations of the plurality of location indicators based on the predetermined path.

At block 345 in the example method 303, of FIG. 3, the determined location of the vehicle can be compared to a corresponding predetermined location for the vehicle. At block 347 in the example method 303 of FIG. 3, a direction of the vehicle along a predetermined path within the indoor facility can be adjusted in response to the determined location being different than the predetermined location of the vehicle.

In at least one embodiment, the method 303 can further include embedding at least two of the plurality of location indicators within a roadway that the vehicle is traveling on. In at least one embodiment, the method 303 can further include receiving data from the embedded at least two location indicators indicating an anticipated location of an additional location indicator not embedded in the roadway.

Figure 4:
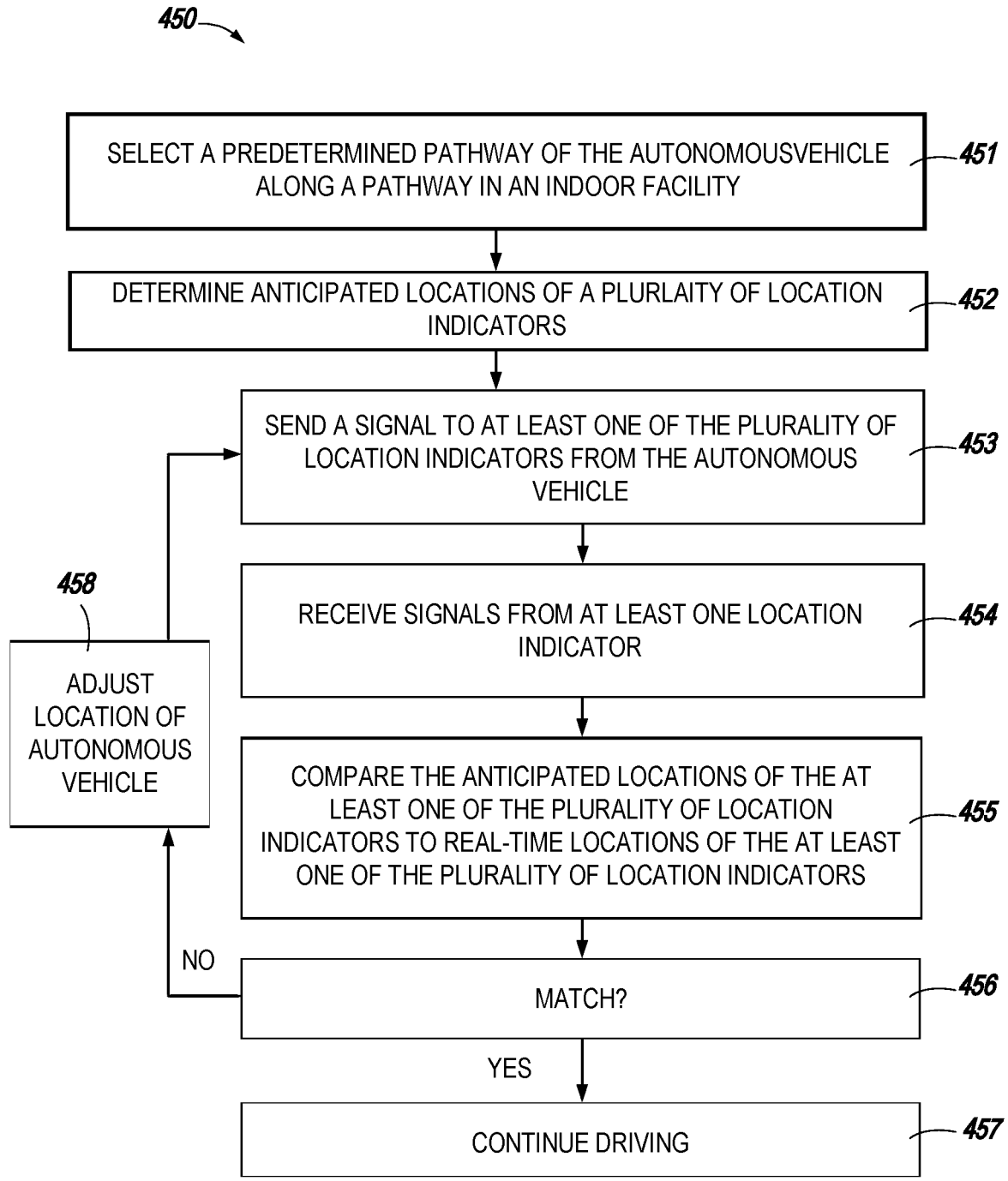
FIG. 4 is a flow diagram corresponding to a method for localization of an autonomous vehicle in accordance with some embodiments of the present disclosure.

FIG. 4 is a flow diagram corresponding to a method 450 for operating a memory device in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the location circuitry 112 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 451, a predetermined pathway of a vehicle moving along a pathway in an indoor facility can be selected. The selection of the predetermined pathway can include selecting a map that includes a pathway for the vehicle to travel along. At operation 452, anticipated locations of a plurality of location indicators can be determined. The anticipated locations can be correlated with the selected predetermined pathway. As an example, the location indicators can be located along the predetermined pathway, or adjacent to the predetermined pathway.

At operation 453, a signal can be sent to at least one of the plurality of location indicators from the vehicle. The signal can include a laser signal. The plurality of location indicators can be the plurality of location indicators 224 in FIG. 2A. At operation 454, signals can be received from at least one of the location indicators. The received signals can be received at a sensor positioned on the vehicle. The sensor can be activated upon receipt of the signals. The sensors can be located on the vehicle or at specific locations along or alongside the pathways. As an example, an active device (such as Bluetooth, infra-red, modulated light source, or sonar devices) on a vehicle can read data from pre-fixed sensors along the pathway. As an example, a passive device (such as mirror, magnetic ID, RFID, or LED devices) on a vehicle can read an active signal from pre-fixed emitters along the pathway.

At operation 455, the anticipated locations of the at least one of the plurality of location indicators can be compared to real-time locations of the at least one of the plurality of location indicators. At operation 456, whether an anticipated location matches a real-time location can be determined. In response to none of the anticipated locations matching none of the real-time locations, a location of the vehicle can be adjusted and additional signals can be sent to the at least one of the plurality of location indicators and the process (described as operations 453 through 456, can be repeated until there is a match). At operation 457, in response to an anticipated location matching a real-time location, the vehicle can continue along the pathway.

Figure 5:
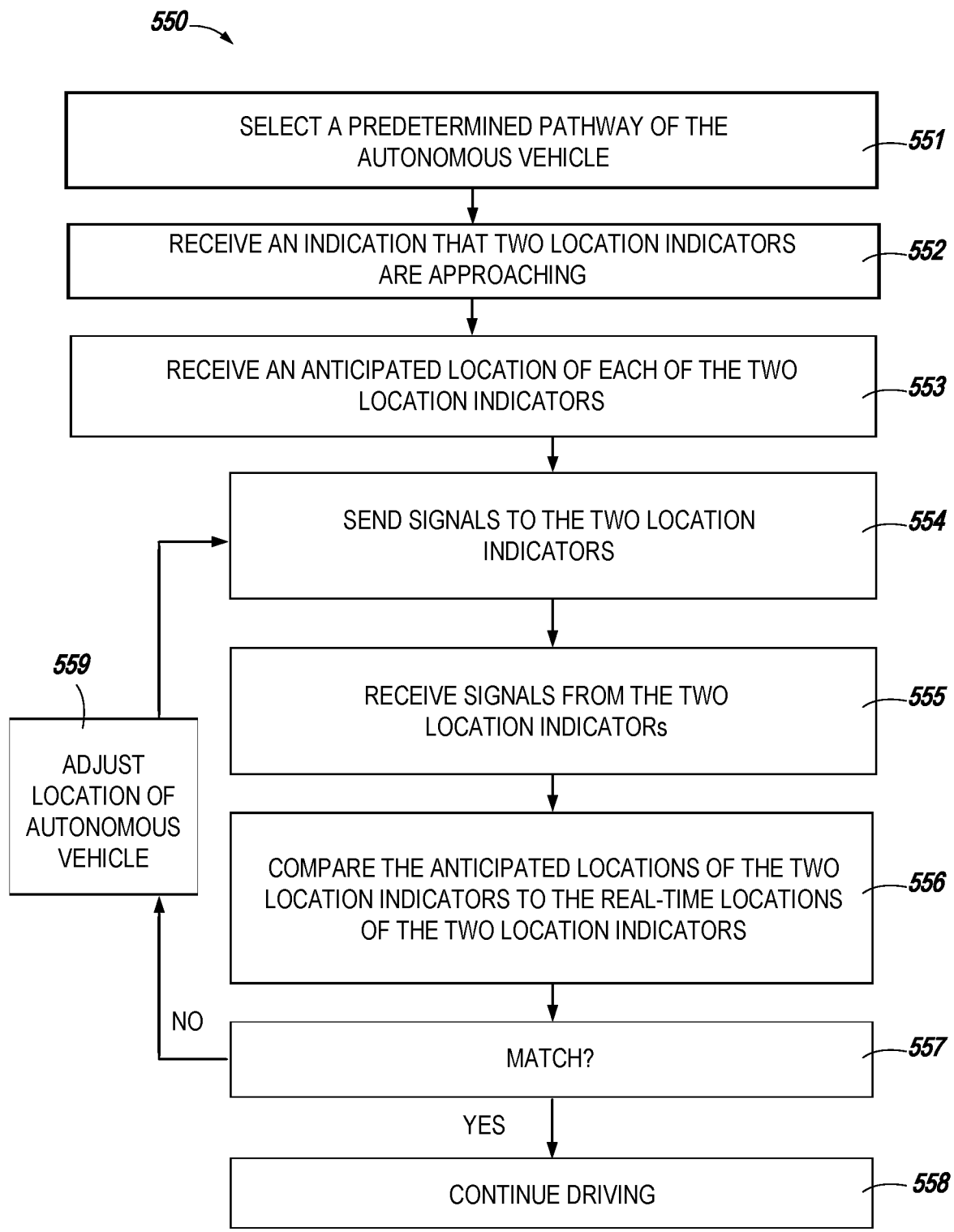
FIG. 5 is a flow diagram corresponding to a method for localization of an autonomous vehicle in accordance with some embodiments of the present disclosure.

FIG. 5 is a flow diagram corresponding to a method for operating a memory device in accordance with some embodiments of the present disclosure. The method 550 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 550 is performed by the location circuitry 112 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 551, a predetermined pathway of a vehicle moving along a pathway in an indoor facility can be selected. The selection of the predetermined pathway can include selecting a map that includes a pathway for the vehicle to travel along. At operation 552, an indication that two location indicators are approaching can be received. The indication can be received in response to the vehicle is within a threshold distance of the location indicator. A number of indications can be sent that each indicate a decreasing distance to the location indicator. For instance, a first indication can indicate the vehicle is within 50 feet, a second indication can indicate the vehicle is within 30 feet, a third indication can indicate the vehicle is within 10 feet, etc. In this way, the vehicle can anticipate the approach of the location indicator.

At operation 553, anticipated locations of each of the two location indicators can be received. The anticipated locations can be correlated with the selected predetermined pathway. As an example, the location indicators can be located along the predetermined pathway, or adjacent to the predetermined pathway.

At operation 554, a signal can be sent to each of the two location indicators from the vehicle. The signal can include a laser signal. The plurality of location indicators can be the plurality of location indicators 224 in FIG. 2A. At operation 555, signals can be received from the two location indicators. The received signals can be received at a sensor positioned on the vehicle. The sensor can be activated upon receipt of the signals.

At operation 556, the anticipated locations of the two location indicators can be compared to real-time locations of the at least one of the plurality of location indicators. The comparison can include a comparison of the distance between the two location indicators. At operation 557, whether an anticipated location matches a real-time location can be determined. In response to none of the anticipated locations matching none of the real-time locations, a location of the vehicle can be adjusted and additional signals can be sent to the at least one of the plurality of location indicators and the process (described as operations 554 through 557, can be repeated until there is a match). At operation 558, in response to an anticipated location matching a real-time location, the vehicle can continue along the pathway.

Figure 6:
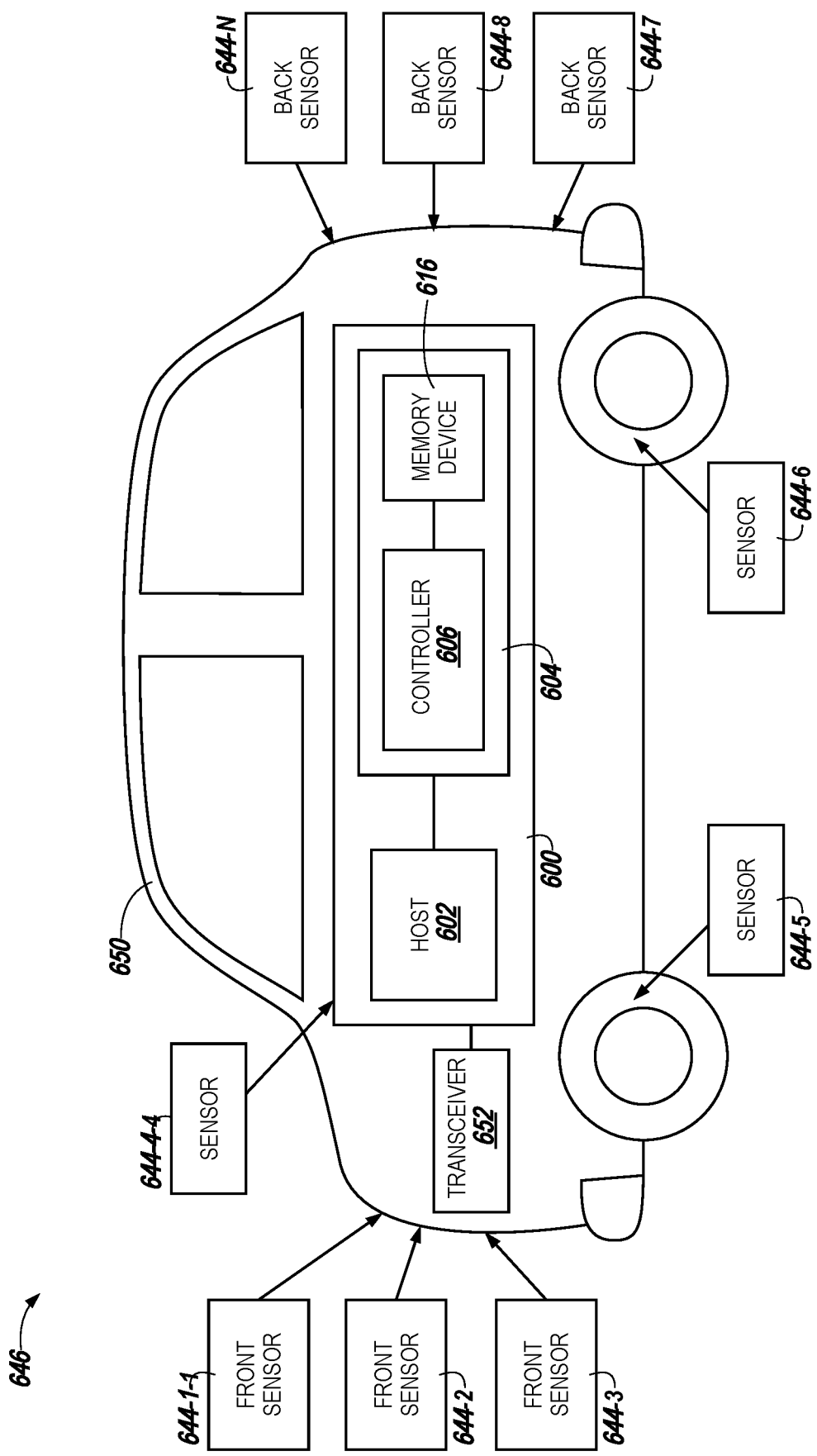
FIG. 6 illustrates an example of a system including a computing system in a vehicle in accordance with some embodiments of the present disclosure.

FIG. 6 illustrates an example of a system 646 including a computing system 600 in a vehicle in accordance with some embodiments of the present disclosure. The computing system 600 can include a memory sub-system 604, which is illustrated as including a controller 606 and non-volatile memory device 616 for simplicity but is analogous to the memory sub-system 104 illustrated in FIG. 1. The computing system 600, and thus the host 602, can be coupled to a number of sensors 644 either directly, as illustrated for the sensor 644-4 or via a transceiver 652 as illustrated for the sensors 644-1, 644-2, 644-3, 644-5, 644-6, 644-7, 644-8, . . . , 644-N. The transceiver 652 is able to receive data from the sensors 644 wirelessly, such as by radio frequency communication. In at least one embodiment, each of the sensors 644 can communicate with the computing system 600 wirelessly via the transceiver 652. In at least one embodiment, each of the sensors 644 is connected directly to the computing system 600 (e.g., via wires or optical cables).

The vehicle 650 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 644 are illustrated in FIG. 6 as including example attributes. For example, sensors 644-1, 644-2, and 644-3 are cameras collecting data from the front of the vehicle 650. Sensors 644-4, 644-5, and 644-6 are microphone sensors collecting data from the from the front, middle, and back of the vehicle 650. The sensors 644-7, 644-8, and 644-N are cameras collecting data from the back of the vehicle 650. As another example, the sensors 644-5, 644-6 are tire pressure sensors. As another example, the sensor 644-4 is a navigation sensor, such as a global positioning system (GPS) receiver. As another example, the sensor 644-6 is a speedometer. As another example, the sensor 644-4 represents a number of engine sensors such as a temperature sensor, a pressure sensor, a voltmeter, an ammeter, a tachometer, a fuel gauge, etc. As another example, the sensor 644-4 represents a camera. Video data can be received from any of the sensors 644 associated with the vehicle 650 comprising cameras. In at least one embodiment, the video data can be compressed by the host 602 before providing the video data to the memory sub-system 604.

The host 602 can execute instructions to provide an overall control system and/or operating system for the vehicle 650. The host 602 can be a controller designed to assist in automation endeavors of the vehicle 650. For example, the host 602 can be an advanced driver assistance system controller (ADAS). An ADAS can monitor data to prevent accidents and provide warning of potentially unsafe situations. For example, the ADAS can monitor sensors in the vehicle 650 and take control of vehicle 650 operations to avoid accident or injury (e.g., to avoid accidents in the case of an incapacitated user of a vehicle). The host 602 may need to act and make decisions quickly to avoid accidents. The memory sub-system 604 can store reference data in the non-volatile memory device 616 such that data from the sensors 644 can be compared to the reference data by the host 602 in order to make quick decisions.

Figure 7:
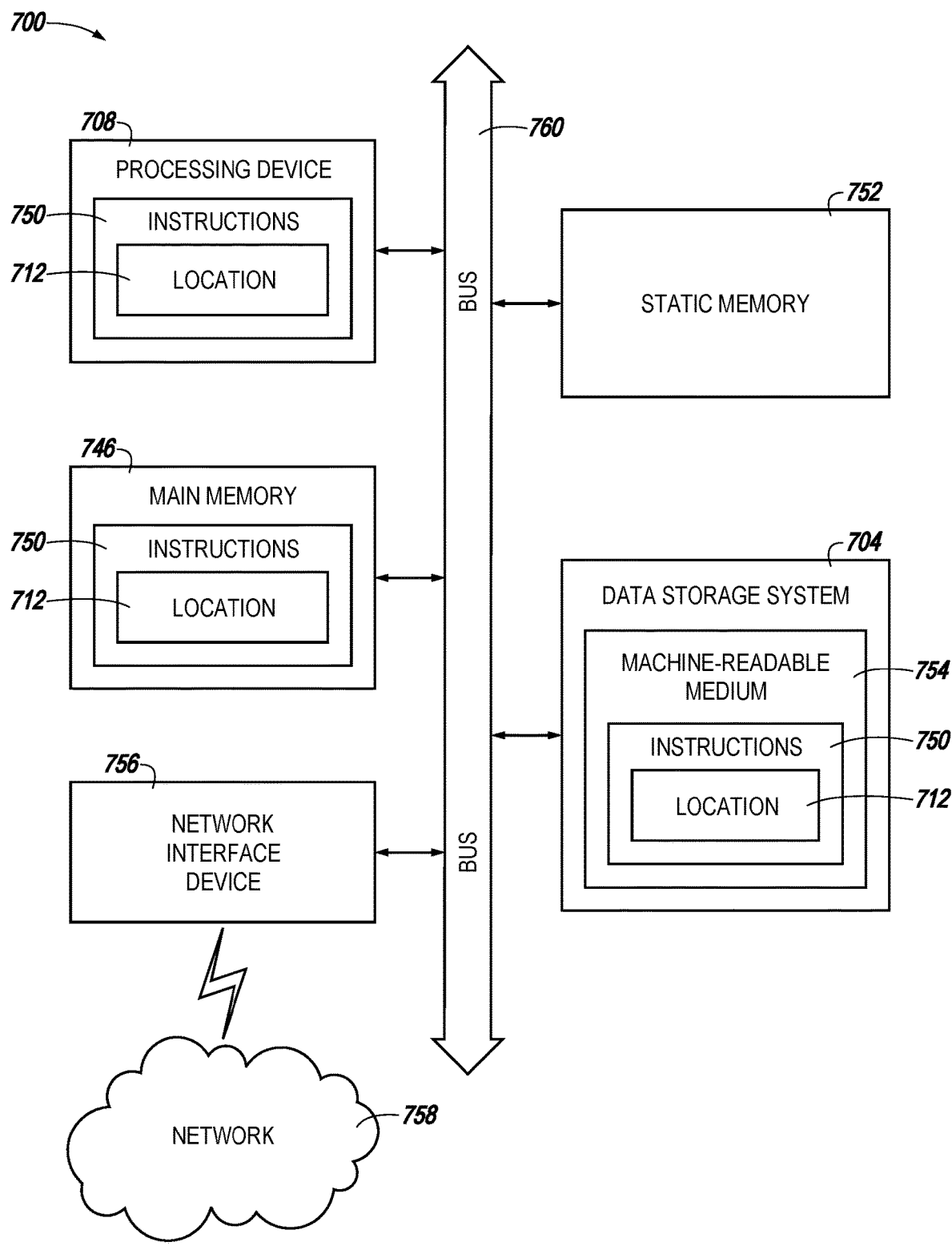
FIG. 7 is a block diagram of an example computer system in which embodiments of the present disclosure may operate.

FIG. 7 is a block diagram of an example computer system in which embodiments of the present disclosure may operate. Within the computing system 700, a set of instructions, for causing a machine to perform one or more of the methodologies discussed herein, can be executed. The computing system 700 includes a processing device 708, a main memory 746, a static memory 752 (e.g., flash memory, static random access memory (SRAM), etc.), and a data storage system 704, which communicate with each other via a bus 760. The data storage system 704 is analogous to the memory sub-system 104 illustrated in FIG. 1.

The processing device 708 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 708 can also be one or more special-purpose processing devices such as an ASIC, an FPGA, a digital signal processor (DSP), network processor, or the like. The processing device 708 is configured to execute instructions 750 for performing the operations and steps discussed herein. The computing system 700 can further include a network interface device 756 to communicate over a network 758.

The data storage system 704 can include a machine-readable storage medium 754 (also known as a computer-readable medium) on which is stored one or more sets of instructions 750 or software embodying any one or more of the methodologies or functions described herein. The instructions 750 can also reside, completely or at least partially, within the main memory 746 and/or within the processing device 708 during execution thereof by the computing system 700, the main memory 746 and the processing device 708 also constituting machine-readable storage media.

In one embodiment, the instructions 750 include instructions to implement functionality corresponding to the allocation circuitry 112 of FIG. 1. The instructions can include allocation 712 instructions to allocate a first portion of a plurality of blocks of a memory device for storage of file system metadata based on a file system and a capacity of the memory device. While the machine-readable storage medium 754 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a machine-readable storage medium, such as, but not limited to, types of disks, semiconductor-based memory, magnetic or optical cards, or other types of media suitable for storing electronic instructions.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method of operating an autonomous vehicle within an indoor facility, comprising:
sending, via a processing device, a signal to at least two of a plurality of location indicators from an autonomous vehicle in motion and transporting equipment or passengers during a traversal of a first predetermined pathway;
receiving signals from the at least two location indicators;
determining a first location of the autonomous vehicle within an indoor facility based on the received signals; and
comparing the determined first location to a corresponding pre-determined first location;
in response to the determined first location being different than the pre-determined first location, adjusting a direction of the autonomous vehicle along the first predetermined pathway within the indoor facility; and
during a traversal of a second predetermined pathway, using the first determined location of the first predetermined pathway to determine a second determined location of the second predetermined pathway.

2. The method of claim 1, wherein the plurality of location indicators comprise a plurality of reflective mirrors.

3. The method of claim 2, wherein the plurality of reflective mirrors are movably fixable to a particular location along the first predetermined pathway.

4. The method of claim 1, further comprising determining the first location of the vehicle in the absence of global positioning system (GPS) data.

5. The method of claim 1, further comprising sending the signal to the at least two reflective mirrors via lasers mounted to the autonomous vehicle.

6. The method of claim 1, further comprising sending the signal to the at least two reflective mirrors in response to the autonomous vehicle arriving at a predefined location area.

7. The method of claim 1, further the at least two of the plurality of location indicators are positioned at a particular location on a roadway that the autonomous vehicle is traveling on.

8. The method of claim 1, wherein determining the first location of the autonomous vehicle comprises:
   determining a predetermined path of the autonomous vehicle and predetermined locations of the plurality of location indicators based on the predetermined path; and
   comparing the predetermined locations of the plurality of location indicators to real-time locations of the plurality of location indicators based on the received signals.

9. The method of claim 8, further comprising adjusting movement of the autonomous vehicle based on the comparison.

10. The method of claim 1, further comprising adjusting the direction of the autonomous vehicle based on a prior iteration of determining the second location of the autonomous vehicle while traveling along an additional predetermined pathway.

11. The method of claim 1, further comprising:
   embedding at least two of the plurality of location indicators within a roadway that the autonomous vehicle is traveling on; and
   receiving data from the embedded at least two location indicators indicating an anticipated location of an additional location indicator not embedded in the roadway.

12. A system for transporting equipment or passengers using an autonomous vehicle, comprising:
   a memory device within an autonomous vehicle for transporting equipment or passengers; and
   a processing device coupled to the memory device, the processing device configured to:
      select a first predetermined pathway of the autonomous vehicle along a first pathway in an indoor facility;
      determine anticipated locations of a plurality of location indicators based on the selected first predetermined pathway prior to the autonomous vehicle traversing the first predetermined pathway, wherein the plurality of location indicators are intermittently located along the first predetermined pathway;
      send a signal to at least one of the plurality of location indicators from the autonomous vehicle in motion along the first predetermined pathway;
      receive signals from the at least one location indicator; and
      compare the anticipated locations of the at least one of the plurality of location indicators to real-time locations of the at least one of the plurality of location indicators based on the received signals;
      select a second predetermined pathway of the autonomous vehicle along a second pathway in the indoor facility; and
      compare additional anticipated locations of the at least one of the plurality of location indicators to additional real-time locations of the at least one of the plurality of location indicators based on additional received signals and the comparison of the anticipated locations to real-time locations in an iterative, machine learning operation.

13. The system of claim 12, wherein the sent signal comprises a radio-frequency identification (RFID) signal or a laser signal, or both.

14. The system of claim 12, wherein the processing device is further configured to adjust a direction of the autonomous vehicle along the first pathway in response to the anticipated location of one of the plurality of location indicators being different than the real-time location of the respective one of the plurality of location indicators.

15. The system of claim 12, wherein:
   the at least one of the plurality of location indicators is a reflective mirror;
   the sent signal is a laser signal; and
   the received signal is the laser signal being reflected from the reflective mirror.

16. The system of claim 15, wherein the processing device is further configured to determine a location of the reflective mirror based on the received signal.

17. The system of claim 16, wherein the processing device is further configured to:
   in response to the determined location of the reflective mirror being a same location as the anticipated location of the reflective mirror, confirming a direction on the pathway of the vehicle; and
   in response to the determine location of the reflective mirror being different than the anticipated location of the reflective mirror, adjusting a direction of the autonomous vehicle.

18. A non-transitory machine readable medium storing instructions executable to:
   select a first predetermined pathway of an autonomous vehicle;
   receive, from a roadway component, while the autonomous vehicle is traversing the first predetermined pathway:
      an indication that two location indicators of a plurality of location indicators are approaching, wherein the two location indicators are a particular distance apart; and
      an anticipated location of each of the two location indicators;
   send a signal to each of the two location indicators;
   receive a signal from each of the two location indicators;
   compare the anticipated location of each of the two location indicators to a real-time location of each of the two location indicators based on the received signals; wherein:
      the comparison is performed in the absence of global positioning system (GPS) data; and
      the comparison is based on the particular distance between the two location indicators and a distance from each of the two location indicators to the vehicle; and
   select a second predetermined pathway of the autonomous vehicle along a second pathway in the indoor facility; and
   compare additional anticipated locations of each of the two location indicators to additional real-time locations of each of the two location indicators based on additional received signals and the comparison of the anticipated location to the real-time location in an iterative, machine learning operation.

19. The medium of claim 18, wherein the instructions are further executable to change a location of at least one of the plurality of location indicators.

20. The medium of claim 18, wherein the instructions are further executable to:
   in response to the anticipated location being different than the real-time location, adjust a position of the vehicle; and send an additional signal to the particular location indicator.

21. The medium of claim 19, wherein the instructions are further executable to:
repeatedly send and receive signals from the particular location indicator until the anticipated location and a most recent real-time location of the particular location indicator is a same location.

22. The medium of claim 18, wherein the instructions are further executable to:
determine a location of the additional location indicator based on the additional received signal;
compare the anticipated location of the additional location indicator and a real-time location based on the received signal from the additional location indicator; and
combine the comparisons associated with the particular location indicator and the additional location indicator and determine a location of the vehicle.

* * * * *